Sept. 1, 1936.  R. A. CHRISTIAN ET AL  2,052,604

CALCULATING MACHINE

Filed April 16, 1934   6 Sheets-Sheet 1

FIG. 1

| | JOHN DOE IN ACCOUNT WITH ANY BANK & TRUST CO. ANYWHERE | | | | | | |
|---|---|---|---|---|---|---|---|
| OLD BALANCE. | DATE. | CHECKS | CHECKS | TAX. | DEPOSITS | NEW BAL. | |
| 6 500.00 | MAY-1-33 | 100.00 | | .02 | | MAY-1-33 | 6 399.98* |
| 6 399.98 | MAY-2-33 | 200.00 | 50.00 | .04 | | MAY-2-33 | 6 149.94* |
| 6 149.94 | MAY-3-33 | 10.00 | 20.00 | | | | |
| | MAY-3-33 | 5.00 | | .06 | | MAY-3-33 | 6 114.88* |
| 6 114.88 | MAY-10-33 | 10.00 | 10.00 | | | | |
| | MAY-10-33 | 5.00 | 5.00 | .08 | 30.08 | MAY-10-33 | 6 114.88* |
| 6 114.88 | MAY-12-LS | 100.00* | | .10* | | MAY-12-33 | 6 014.78* |
| 6 014.78 | MAY-20-33 | 10.00 | 5.00EX | | | | |
| | MAY-20-33 | 20.0 OEX | 100.00 | | | | |
| | MAY-20-33 | 50.00 | | .06 | | MAY-20-33 | 5 829.72* |
| 5 829.72 | MAY-21-33 | 5000.00 | 829.70 | .04 | | MAY-21-33 | .02-OD |

FIG. 2

| | RICHARD ROE IN ACCOUNT WITH ANY BANK & TRUST CO. ANYWHERE | | | | | | |
|---|---|---|---|---|---|---|---|
| OLD BALANCE | DATE. | CHECKS. | CHECKS. | CHECKS. | DEPOSITS | NEW BAL. | |
| 499.98 | MAY-14-33 | 50.00 | 5.00 | | | | |
| | MAY-14-33 | 60.00 | 6.00 | 7.00 | 20.00 | MAY-14-33 | 391.98* |
| 391.98 | MAY-16-33 | 200.00 | 81.00 | 40.00 | 10.00 | MAY-16-33 | 80.98* |
| 80.98 | MAY-20-33 | 60.00 | 50.00 | | 10.00 | MAY-20-33 | 19.02-0.D |
| 19.02 | MAY-21-33 | | | | 20.00 | MAY-21-33 | .98* |

Inventor
Raymond A. Christian
Jesse R. Ganger
and Earl E. Holt

By *Earl Benst* their Attorney

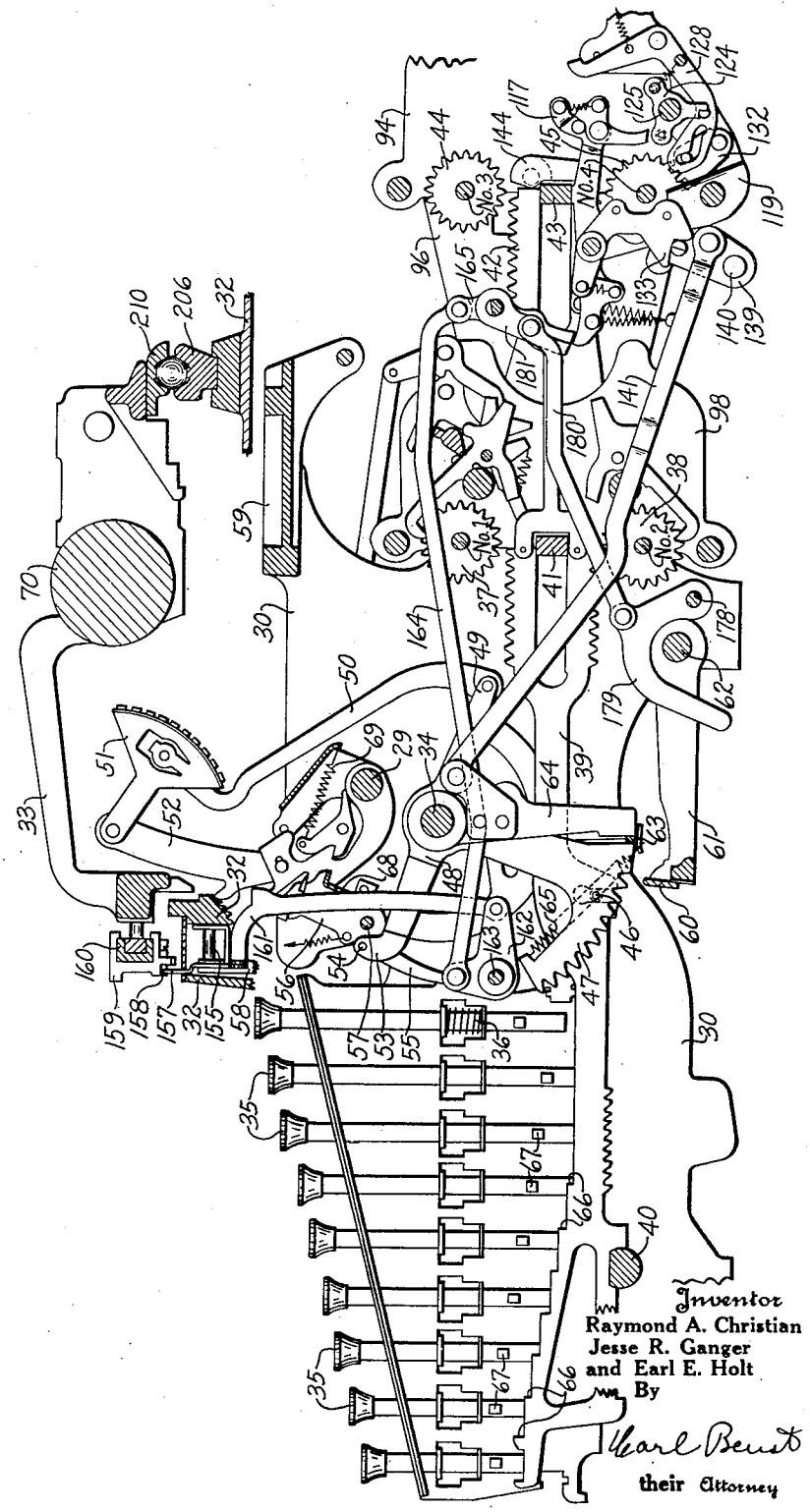

Sept. 1, 1936.   R. A. CHRISTIAN ET AL   2,052,604
CALCULATING MACHINE
Filed April 16, 1934   6 Sheets-Sheet 3
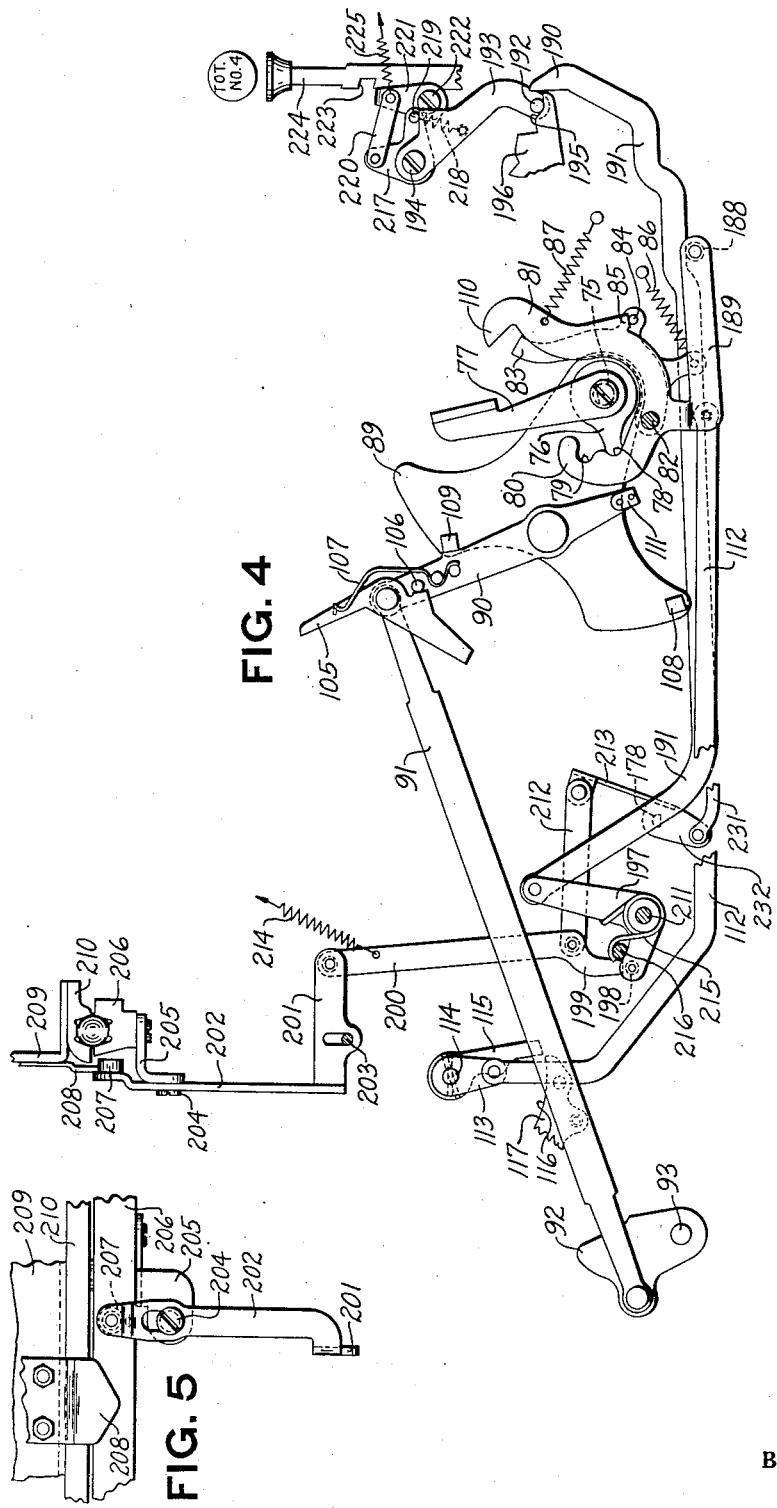
Inventor
Raymond A. Christian
Jesse R. Ganger
and Earl E. Holt
By Earl Benst
their Attorney Sept. 1, 1936.  R. A. CHRISTIAN ET AL  2,052,604
CALCULATING MACHINE
Filed April 16, 1934    6 Sheets-Sheet 4
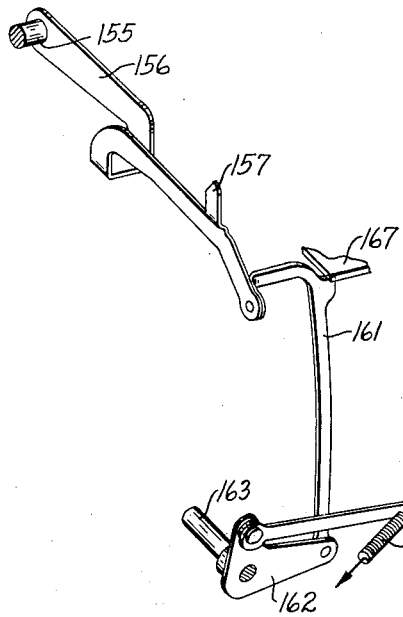
FIG. 6
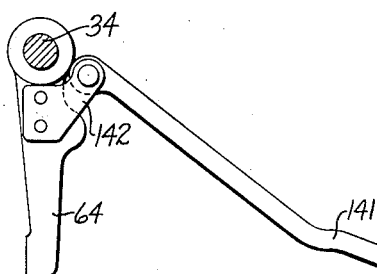
FIG. 7
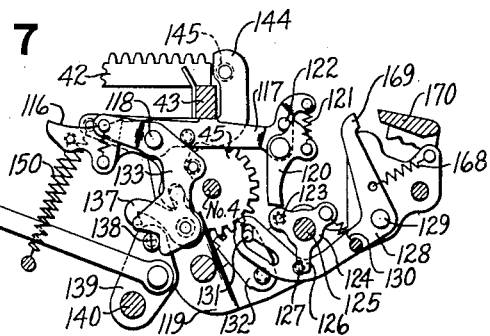
FIG. 8
FIG. 9
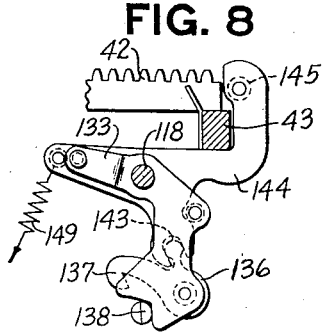
Inventor
Raymond A. Christian
Jesse R. Ganger
and Earl E. Holt
By Earl Benst
their Attorney

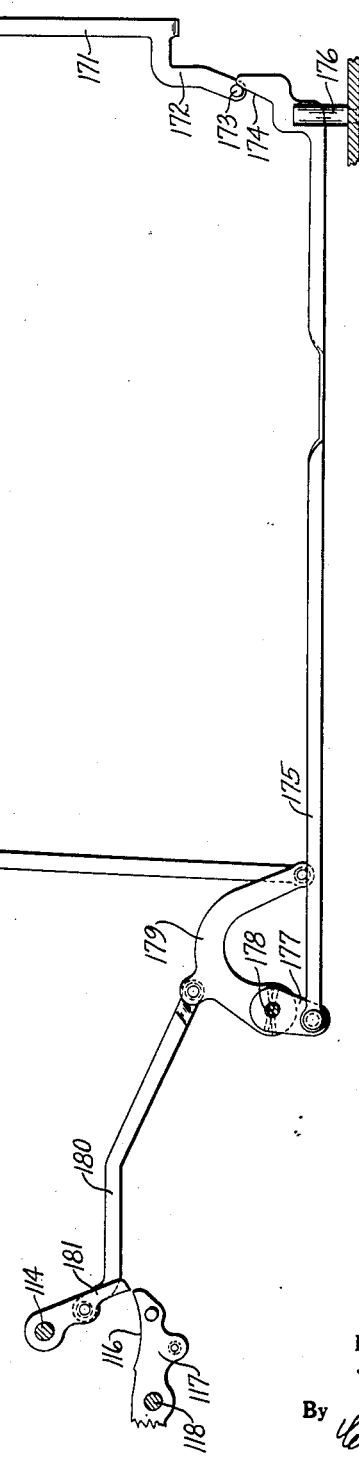
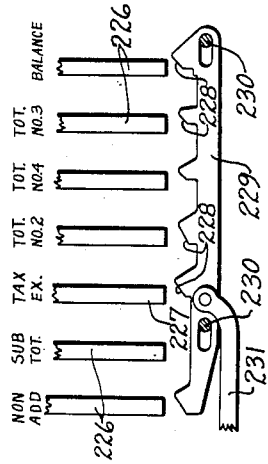
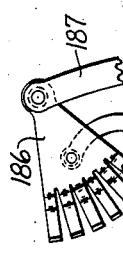

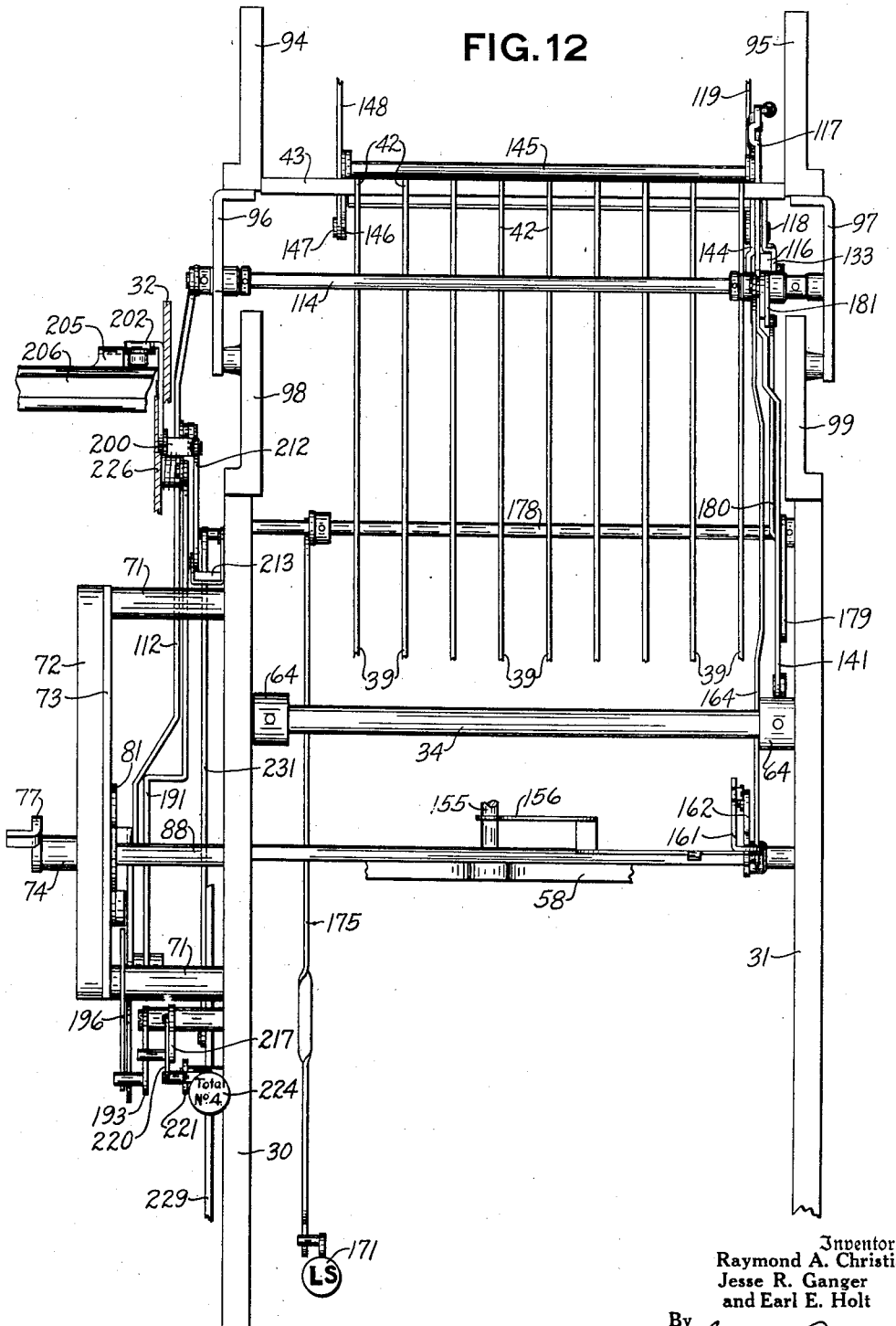

Patented Sept. 1, 1936

2,052,604

UNITED STATES PATENT OFFICE 2,052,604

CALCULATING MACHINE

Raymond A. Christian, Jesse R. Ganger, and Earl E. Holt, Dayton, Ohio, assignors to The National Cash Register Company, Dayton, Ohio, a corporation of Maryland Application April 16, 1934, Serial No. 720,728

18 Claims. (Cl. 235—60)

This invention relates to improvements in calculating machines otherwise known as accounting or bookkeeping machines.

The placing of a Federal tax upon checks issued by individuals placed an additional bookkeeping burden upon the banks in the handling of checking accounts. For example, for each check issued it is necessary to deduct the tax from the individual's balance and to keep a record of the amount of tax collected by the bank. The condition is further complicated due to the fact that some non-negotiable checks such as counter checks are tax free. This fact must also be recorded and in such a case naturally there will be no tax deduction.

As the responsibility for collecting this Federal tax is placed upon the banks, it can readily be seen that the bookkeeping duties of such banks have been materially increased. Especially is this true where the calculating machine operator has to list and compute the tax for each individual check.

Therefore broadly it is an object of this invention to alleviate the above condition by providing a calculating machine to automatically calculate the tax as the individual checks are posted.

A more specific object is to provide means for causing an amount to be added in one of the machine totalizers each time certain items are listed and computed.

Another object is to supply means to control the automatic adding feature so that it may be enabled or disabled at will.

An additional object is to provide means to enable the automatic adding feature when the traveling carriage is in certain tabulated positions.

Still another object is to provide means to disable the adding feature when no amount key is depressed.

A further object is to furnish means to automatically condition the tax totalizer for total taking operations when the tax feature is enabled and when the traveling carriage is in certain tabulated positions.

Another object is to provide means to disable the tax feature totalizer both for tax accumulation and automatic total taking when certain control keys are depressed.

With these and incidental objects in view, the invention consists of certain novel features of construction and combinations of parts, the essential elements of which are set forth in appended claims and a preferred form of embodiment of which is hereinafter described with reference to the drawings which accompany and form part of this specification.

Of said drawings:

Fig. 1 is a facsimile of a fragment of a ledger sheet used for the balancing of individual accounts when the automatic tax feature is being used.

Fig. 2 is a fragment of a ledger sheet used in a system which does not employ the automatic tax feature.

Fig. 3 is a sectional view of the machine taken along side a row of amount keys as observed from the right hand side of the machine.

Fig. 4 is a side elevation as observed from the left of the machine picturing the controlling mechanisms for the automatic tax feature.

Fig. 5 is a detail view as observed from the rear of the machine depicting the means whereby the traveling carriage automatically conditions the tax totalizer for a total taking operation.

Fig. 6 is a perspective view of the mechanism controlled by the traveling carriage for enabling the tax accumulating mechanism.

Fig. 7 is a side elevation depicting the tax accumulating mechanism.

Fig. 8 is a detail view of the mechanism controlled by the machine actuators for enabling the tax accumulating mechanism.

Fig. 9 is a detail view of the release arm for the tax accumulating mechanism.

Fig. 10 is a side elevation as observed from the left of the machine picturing the mechanism for disabling the tax accumulating mechanism by means of the list keys.

Fig. 11 is a detail view of the symbol segment control cam.

Fig. 12 is a top plan view of a portion of the machine showing in particular the mechanism of the instant invention.

General description

Mechanism of the instant invention is shown incorporated in the well known Ellis calculating machine which is fully illustrated and described in Letters Patent of the United States Nos. 1,197,276 and 1,197,278 issued September 5, 1916, to Halcolm Ellis and Patent No. 1,819,084 issued August 18, 1931, to Emil John Ens.

The machine of this invention is equipped with a traveling carriage and, if desired may also be equipped with typewriter keyboard. This machine is equipped with four totalizers one of which is adapted for both addition and subtraction.

In banking institutions it is customary to balance each checking account daily. This is accomplished in the majority of such institutions by the use of accounting or bookkeeping machines such as the Ellis. With but few exceptions these institutions use a system requiring a ledger or posting sheet for each individual account. A fragment of such a ledger sheet is shown in Fig. 2. These ledger sheets are divided into a plurality of vertical columns which are generally used in the following manner: The extreme left hand column is used for the posting of old balances, next in order is a column for the date following which a space is provided for the posting of checks, next in order is a space for deposits and on the extreme right of the ledger sheet is a column for the posting of new balances. It will be noted that the ledger sheet shown in Fig. 2 does not provide a space for posting the tax.

Fig. 1 shows a fragment of a ledger sheet employed where the automatic tax feature is used. This ledger sheet like the sheet shown in Fig. 2 has an old balance column, a date column, a space for the posting of checks, a space for deposits, a space for new balances, and in addition has a tax column for the printing of the tax on checks posted during a certain period.

The machine is constructed to automatically accumulate the amount of tax to be collected. This accumulation is accomplished automatically at the time of, and simultaneously with, the entry of the amounts of the checks.

The automatic tax feature may be enabled or disabled at will by shifting a lever conveniently located on the left hand side of the machine. When the automatic tax feature is enabled one of the totalizers is used solely for the accumulation of the tax. Each time a check is posted the two cent tax is automatically accumulated in the tax totalizer by means of a novel actuating mechanism which advances the units of cents totalizer wheel two increments of movement for each check listed. By disabling the tax feature the machine may be used as a regular calculating machine. This increases the totalizer capacity of the machine by making the tax totalizer available for any other desired purpose.

The tax accumulating mechanism is normally disabled, however stops arranged on the traveling carriage function when said traveling carriage is tabulated to the check column to enable the tax accumulating mechanism and simultaneously condition the add-subtract or balance totalizer for subtraction.

As previously stated certain types of non-negotiable checks are tax free or exempt from taxation. Depressing one of the control keys marked "Tax Ex." (Fig. 11), in conjunction with the amount keys when posting a tax exempt check, disables the tax accumulating mechanism during that particular machine operation.

After all the checks for a certain period have been posted the traveling carriage is tabulated so that the tax column on the ledger sheet is in line with the printing type. In this position a stop on the traveling carriage selects the add-subtract totalizer for a subtract operation and at the same time conditions the tax totalizer for a total taking operation. Releasing the machine for operation causes the total tax on the checks posted at that time to be printed in the tax column and simultaneously subtracted from the add-subtract totalizer. This leaves a net new balance of the customer's account standing on the add-subtract totalizer.

In some instances it is customary for the bank to assemble several checks in a bunch, place a sticker around this bunch and jot down on the sticker the total amount of the checks and the number of checks in the bunch. In such a case the operator sets up the total amount of the checks on the keyboard and depresses a control key marked LS which disables the tax accumulating mechanism, thereby preventing accumulation in the tax totalizer upon this operation of the machine. After this operation the traveling carriage is tabulated to the tax column, the LS key is again depressed and the amount of the tax of the total number of checks is set up on the keyboard and the machine released for operation in the usual manner. This causes the tax on the total number of checks in the bunch to be subtracted from the add-subtract totalizer and simultaneously posted in the tax column on the ledger sheet.

In addition to those already set out, there are several other ways or means of rendering the tax accumulating mechanism ineffective. For example, depression of any of the total or sub-total control keys renders the tax accumulating mechanism ineffective as also does the failure to depress any of the amount keys. When the traveling carriage is tabulated to a position where a column other than the check column is opposite the printing point, the tax accumulating mechanism is automatically disabled.

The tax actuating mechanism is independent of the regular totalizer actuating mechanism and the only time that the tax totalizer is engaged with the regular machine actuators, when the automatic tax accumulating feature is being used, is for a short period when the actuators are dwelling in their moved positions. This is to enable the spring actuated tax actuating mechanism to be reset.

The mechanism briefly outlined in the foregoing general description, pertinent to the instant invention will now be described in detail.

Detailed description

*Operating mechanism and keyboard.*—As previously stated, the machine embodying the instant invention is an accounting machine of the well known Ellis type. The mechanism of this machine is supported between two main frames 30 and 31, Fig. 12, mounted parallel to each other upon a base plate, (not shown) and connected by various cross frames and braces. A machine case 32, fragments of which are shown in Fig. 3, also secured to the machine base plate encloses the mechanism of the machine and supports a traveling carriage 33 which is mounted to slide laterally upon ways integral with said machine case.

Releasing the machine for operation clutches the usual electric motor (not shown) to the machine operating mechanism, from which it is automatically declutched at the end of machine operation. Rotation of the operating means oscillates a shaft 34 (Fig. 3) first counterclockwise and then back to normal position as here shown.

The keyboard of the instant machine comprises a plurality of rows of depressible amount keys 35 (Fig. 3) normally retained upward by compression springs 36. Located on the left hand side of the keyboard is a row of control keys which govern the various functions of the machine.

Among the control keys is a total key for each of the four totalizers, a sub-total key which when used in conjunction with any one of the total keys causes a sub-total taking operation to be performed in that particular totalizer. Other control keys are a tax exempt key, a non-add key, a No. 1 add key, a No. 2 add key, and a release key, depression of the latter releases any depressed amount or control key or keys.

*Totalizers.*—The machine of the instant invention has four totalizers arranged vertically in pairs at the rear of the machine, Fig. 3. For convenience these totalizers will be numbered in the same manner as has heretofore been the custom. The upper front totalizer will be called No. 1, lower front No. 2, upper rear No. 3, and lower rear No. 4. The No. 1 totalizer is an add-subtract totalizer also commonly known as a balance totalizer or a cross footer. As here illustrated the other three totalizer lines are adapted for addition only. The wheels 37 of the No. 1 totalizer and the wheels 38 of the No. 2 totalizer have teeth which cooperate with similar teeth on an actuator rack 39 mounted for horizontal reciprocating movement in slotted bars 40 and 41 supported by the machine frames 30 and 31. Secured to the rack 39 is an extension rack 42 supported by a cross bar 43 and having teeth which cooperate with the gear wheels 44 of the No. 3 totalizer and gear wheels 45 of the No. 4 totalizer.

It might be well to state at this time that there is one such rack 39 and its extension 42 for each denominational row of amount keys 35 and there is also a corresponding wheel of the four totalizers for each actuator rack 39 and extension 42.

Due to the fact that the actuating mechanism is duplicated in each denominational unit of the machine the description of the actuating mechanism for one denominational unit will be sufficient for the purpose of the present invention.

Again referring to Fig. 3, the rack 39 has a vertical slot which embraces a stud 46 carried by a downwardly extending segment 47 of a reducer arm 48 rotatably supported by the shaft 34 and having a rearward extension 49 pivotally connected by a link 50 to a type carrying segment 51 rotatably supported by an arm 52 loose on a printer shaft 29 opposite ends of which are journaled in the frame 31 and the printer frames (not shown). Another extension 53 of the reducer arm 48 carries a stud 54 which cooperates with a tail 55 of an order hook 56 turnably supported by a shaft 57 extending between two plates (not shown) supported by a front cross frame 58 and a rear cross frame 59. The segment 47 of the arm 48 has a plurality of tooth spaces corresponding to the different positions of the rack 39 said spaces adapted to cooperate with an alining bar 60 secured on a yoke 61 fast to a shaft 62 journaled between the frames 30 and 31. Secured on opposite ends of the shaft 34 is a pair of arms connected by a cross bar 63 to form an actuator leading frame 64, see also Fig. 12. The bar 63 is normally maintained in engagement with the segment 47 by means of a spring 65 tension between said cross bar and said segment. The forward end of the rack 39 has a plurality of graduated steps terminating in abrupt surfaces 66 adapted to cooperate with square studs 67 one of which is carried by each of the amount keys 35.

Depressing one of the amount keys 35 places the stud 67 in the path of the corresponding abrupt surface 66. Also the depressing of an amount key releases the zero stop lever (not shown) which retains the rack 39 in its zero position when no amount key is depressed.

Releasing the machine for adding operation causes the shaft 34 and the leading frame 64 to start their initial movement counterclockwise carrying therewith by means of the spring 65 the segment 47 and the rack 39. Movement of the rack 39 and the reducer arm 48 is arrested when the abrupt surface 66 engages the stud 67 of the depressed amount key. However the leading frame 64 completes its initial movement counterclockwise stretching the spring 65. Immediately after the leading frame 64 reaches the end of its initial movement the alining bar 60 is moved into engagement with the teeth of the segment 47 to aline the rack 39 and the printing segment 51. The wheels of the selected totalizer or totalizers are now brought into engagement with the rack 39 or the extension 42 as the case may be. Obviously this initial movement of the reducer arm 48 by means of the link 50 positions the printing segment 51 proportionate with the depressed amount key and by means of the stud 54 in the extension 53 cooperating with the tail 55 rocks the order hook 56 out of engagement with the arm 52. Immediately after the leading frame 64 reaches the end of its initial movement a printer trigger 68 is rocked out of engagement with the arm 52 releasing said arm to the action of a spring 69 which moves said arm clockwise causing the type carrying segment 51 to engage a platen roll 70 to make an impression upon material wound around said platen roll.

Immediately after the impression is made the alining bar 60 is disengaged from the segment 47 and the leading frame 64 starts its return movement clockwise picking up the segment 47 to return it and the rack 39 to their home or zero positions. This return movement of the rack 39 rotates the wheel of the engaged totalizer or totalizers commensurate with the value of the depressed amount keys. After the rack 39 arrives home, the wheels of the engaged totalizers are disengaged from said rack. The usual carrying mechanism is employed to transfer amounts from lower to higher denominations. As stated above there is one of the racks 39 (Fig. 3) and its extension 42, a printing segment 51 and a corresponding wheel on each of the totalizers for each denominational unit.

A non-add operation is exactly like an add operation except depression of the non-add key controls mechanism that prevents any of the totalizers being engaged with the racks 39 or their extensions 42.

A subtract operation differs from an adding operation in that the balance totalizer is engaged with the actuators 39 before they start their initial movement rearwardly which initial movement rotates the wheels of the balance totalizer reversely to an add operation.

The balance totalizer is equipped with an overdraft device controlled by an overdraft key located on the upper righthand side of the keyboard. The operator is notified of the fact that an overdraft has occurred in the balance totalizer by the automatic locking of the balance key against depression. Also the occurrence of an overdraft in the balance totalizer unlocks the overdraft key which is normally locked against depression. Depression of the overdraft key causes the machine to operate through a predetermined number of cycles to transpose a negative overdraft into a positive overdraft and print the result on the ledger sheet. Such automatic overdraft mechanism is shown and described in application for Letters Patent of the United States Serial No. 605,160 filed April 14, 1932, by Charles L. Lee.

As previously stated, total taking operations are controlled by means of total keys located on the lefthand side of the keyboard. In total taking operations the wheels of the selected totalizers are engaged with the racks 39 prior to their initial movement rearwardly. Initial movement of the racks 39 rotates the wheels of the selected totalizer reversely until they are stopped in zero positions by means of the transfer tripping cams which engage the transfer tripping pawls. This positions the racks 39 and the printing segments 51 commensurate with the value of the amount on the totalizer wheels. After the impression is made, if the operation is a total operation the wheels of the selected totalizer are disengaged from the racks 39 thus leaving said wheels standing at zero. If the operation is a sub-total operation the wheels of the selected totalizer remain engaged with the racks 39 until said racks complete their return movement forwardly to replace the amount on said totalizer wheels.

*Tax totalizer mechanism.*—The tax actuating mechanism automatically adds the tax in one of the totalizers, set aside for that purpose, each time a check is posted on the ledger sheet and its amount simultaneously subtracted from the depositors balance. There are several ways to disable the tax accumulating mechanism, for example, depression of a "Tax exempt" key, or depression of an "LS" key disables the tax accumulating mechanism, as also does depression of any of the various control keys, such as the total or sub-total keys, or the non-add key. If it is desired to use the totalizer in which the tax is accumulated in the regular way, the tax actuating mechanism may be rendered ineffective by shifting a lever conveniently located on the left side of the machine. The tax accumulating mechanism will now be described in detail.

Broadly, the tax accumulating mechanism consists of a uniform actuator for entering the amount of tax into the totalizer. As herein disclosed, this tax entry is obtained while the totalizer is disengaged from the usual well known differential actuators. However, the totalizer is engaged with the differential actuators by the usual flying lever mechanism, at the same time as disclosed in the above named patents, that is, after the differential actuators have been set under control of the keys on the keyboard. During the time that the wheels are engaged with the differential actuators, the uniform tax actuator is restored to its normal position, from the moved position into which it was moved on the previous operation of the machine. It is then necessary to disengage the totalizer from differential actuators, and reengage the units wheel with the uniform tax actuator, before the differential actuators are moved towards their home position so that nothing will be added on the tax totalizer by the differential actuators. The present invention includes means, controlled by a lever 77 (Fig. 4) for changing the time of disengaging the totalizer from the differential racks when tax is to be entered into the totalizer, and restoring the control to the usual timing when no tax is to be entered, so that the totalizer can then be used for accumulating amounts in the well known manner. A detailed description of the mechanism for controlling the engagement of the totalizer follows.

*Tax totalizer control mechanism.*—Directing attention to Figs. 4 and 12, secured to the left frame 30 by means of studs 71 is a sub-frame 72 which supports a portion of the control mechanism for the No. 3 and No. 4 totalizers. Secured between the stud frame 72 and the studs 71 is a plate 73 having therein a bushing 74 adapted to rotatably support a tenon 75 of a tax control lever tappet 76. Secured on the left-hand end of the tenon 75 is a tax control lever 77 having a right angled extension which forms a finger-piece. The rounded nose of the tappet 76 cooperates with recesses 78 and 79 in an extension 80 of a totalizer control lever 81 pivotally mounted on a stud 82 secured in the plate 73. Pivoted on the stud 82 is a by-pass pawl 83 carrying a stud 84 which is urged counterclockwise into engagement with a projection 85 of the lever 81 by a spring 86. A spring 87 urges the lever 81 clockwise to retain the recesses 78 and 79 in contact with the nose of the tappet 76.

Still referring to Figs. 4 and 12, secured on a main rock shaft 88 is a totalizer control plate 89 having pivoted thereon a lever 90 pivotally connected by a link 91 to a totalizer engaging lever 92 secured on an engaging shaft 93 opposite ends of which are journaled in rear totalizer side frames 94 and 95 connected by plates 96 and 97 to front totalizer frames 98 and 99 which are in turn secured to the main frames 30 and 31. Turnably mounted on the pivot point between the lever 90 and the link 91 is a pawl 105 urged counterclockwise into contact with a stop stud 106 in the lever 90 by a spring 107.

In all machine operations except an overdraft operation the plate 89 rocks first clockwise and then back to normal position through an approximate angle of 60 degrees. In a normal adding operation the lower end of the pawl 105 is engaged by a stud 108 carried by the plate 89 during initial movement of said plate. This through the link 91 rocks the lever 92 and the shaft 93 clockwise to engage the wheels 45 of the No. 4 totalizer with the actuator racks 39 after said racks have completed their setting movement rearwardly. Return movement forwardly of the racks 39 rotates the totalizer wheels of the No. 4 totalizer commensurate with the amount set up on the machine keyboard.

Immediately after the racks 39 have been returned to their zero position the No. 4 totalizer is disengaged therefrom by means of a stud 109 in the plate 89 which near the end of the return movement counterclockwise of said plate 89 engages the lever 90, which by means of the link 91 rocks the lever 92 and shaft 93 counterclockwise to disengage the wheels of the No. 4 totalizer from the actuators 39.

In total taking operations means (not shown) is moved into the path of the lower end of the lever 90 and initial movement clockwise of the plate 89 causes the lower end of the lever 90 to engage said means to rock the lever 92 and the shaft 93 clockwise to engage the wheels of the No. 4 totalizer with the actuators 39 prior to their initial movement rearwardly, which movement returns the totalizer wheels to zero and sets the printer segments 51 (Fig. 3) commensurate with the amount on said totalizer wheels.

If the operation being performed is a total operation the wheels of the totalizer are disengaged from the racks 39 before said racks start their return movement. If the operation is a sub-total operation the wheels of the totalizer remain in engagement with the actuators 39 during their return movement forwardly to reset the amount on said totalizer wheels. In non-adding operations the lower end of the pawl 105 is rocked out of the path of the stud 108. Consequently the plate 89 operates through a complete cycle without moving the lever 92 or the shaft 93. If a more complete description of this mechanism is desired reference may be had to the patents listed at the beginning of this specification.

With the lever 77 (Fig. 4) in the position here shown, the tappet 76 positions the lever 81 so that a projection 110 thereof and the by-pass pawl 83 are in the path of a block 111 secured to the lower end of the lever 90.

In tax operations the wheels of the No. 4 totalizer are not engaged with the actuators 39 for the purpose of being actuated thereby, but the tax is added into the units of cents wheel of the No. 4 totalizer by means of a spring actuated device very much like the regular transfer mechanism of the standard machine.

In order to reset the spring actuated tax actuating mechanism it is necessary to disengage the units of cents wheel of the No. 4 totalizer from said tax actuating mechanism so that no movement will be imparted to said units of cents wheel at this time. In order to accomplish this it is necessary to engage the No. 4 totalizer with the extensions 42 of the actuator racks 39. Therefore, in order to prevent disturbing the amount on said totalizer wheels it is necessary that they be engaged with the actuators and disengaged therefrom while said actuators remain stationary at the end of their initial movement rearwardly. This result is accomplished in the following manner:

As the plate 89 nears the end of its initial movement clockwise the block 111 on the lever 90 by-passes the upper end of the pawl 83 and engages the projection 110 of the lever 81. This through the lever 90 and the link 91 rocks the lever 92 and the shaft 93 clockwise to disengage the No. 4 totalizer units of cents wheel from the tax actuating mechanism and simultaneously engage the No. 4 totalizer with the actuators 39. Immediately thereafter the tax accumulating mechanism is restored during the first part of the return movement counterclockwise of the plate 89 which causes the block 111 to engage the by-pass pawl 83 to rock the lever 92 and the shaft 93 counterclockwise to home position to disengage the wheels of the No. 4 totalizer from the actuators 39 and to reengage the units of cents wheels with the tax actuating mechanism.

Moving the lever 77 (Fig. 4) clockwise to "off" position causes the tappet 76 to move from the recess 78 into the recess 79. This allows the spring 87 to rock the lever 81 and the by-pass pawl 83 clockwise out of the path of the block 111 thus rendering said lever and by-pass pawl ineffective to control the engaging and disengaging of the No. 4 totalizer during tax operations.

When the lever 77 is in its "off" position the lever 81 and by-pass pawl 83 are out of the path of block 111, and therefore the engagement of the No. 4 totalizer is accomplished in the normal manner as hereinbefore described. It is only when the lever 77 is in "on"-position that the normal engaging timing is changed by lever 81 and by-pass pawl 83.

Tax actuating mechanism.—It will be noted by referring to Figs. 4 and 12 that a link 112 pivotally connects the lever 81 with an arm 113 secured on a shaft 114 opposite ends of which are journaled in the plates 96 and 97. Secured on the right-hand end of the shaft 114 is a pawl 115 the lower end of which cooperates with an arcuate surface 116 (Figs. 7 and 9) of a lever 117 pivotally mounted on a stud 118 secured in a plate 119 (Fig. 12) supported between the rear totalizer frames 94 and 95 by various rods and bars extending between said frames. The lever 117 (Figs. 7 and 9) has pivoted thereto a release pawl 120 urved counter clockwise by a spring 121 into engagement with a stop stud 122 secured in the lever 117.

The lower end of the pawl 120 (Figs. 3, 7 and 9), cooperates with a stud 123 in a latch 124 turnably supported on a rod 125 extending between the rear totalizer frames 94 and 95. An arm 126 of the latch 124 has therein a notch which is normally maintained in engagement with a flattened stud 127 fast in an accumulator arm 128 pivoted on a stud 129 secured in the plate 119, by a spring 130 which is tensioned to urge said latch 124 in a clockwise direction. The arm 128 has therein a cam slot which embraces a stud 131 carried by an actuator segment 132 pivotally mounted on the plate 119 and having teeth which mesh with the units of cents wheel 45 of the No. 4 totalizer.

A projection of the lever 117 is maintained in engagement with the lower surface of the bar 43 by means of a spring 150 which is tensioned to impel said lever 117 in a counterclockwise direction.

Referring to Figs. 7, 8 and 9, turnably mounted on the stud 118 is a plate 133 flexibly connected to the lever 117 by means of a spring 134 which is tensioned to yieldingly maintain said plate 133 in contact with a stud 135 fast in the lever 117. Pivoted on the plate 133 is a latch 136 having a hook 137 which cooperates with a flattened surface on a stud 138 secured in an arm 139 loose on a stud 140 fast in the plate 97 (see also Fig. 12). A link 141 pivotally connects the arm 139 to a plate 142 secured on the righthand arm of the actuator leading frame 64. The latch 136 has a rounded projection 143 which is embraced by a bifurcated extension of an arm 144 pivoted on the stud 118 and having an upward extension connected by a rod 145 to a similar extension of an arm 146 (Fig. 12) pivoted on a stud 147 fast in a plate 148 mounted in fixed relation to the frames 94 and 95 in the same manner as the plate 119. The studs 118 and 147 are in axial alignment, therefore the arms 144 and 146 pivot on the same axis and with the rod 145 form a yoke which cooperates with the upper portion of the actuator rack extensions 42. A spring 149 (Fig. 8) is tensioned to impel the arm 144 counterclockwise to normally maintain said arm in contact with the bar 43.

With the lever 77 in the "on" position, in which it is shown in Fig. 4, the tappet 76 in cooperation with the recess 78 positions the lever 81 so that by means of the link 112, the arm 113 and the shaft 114, the lower end of the pawl 115 is moved out of the path of the arcuate surface 116 of the lever 117. Moving the lever 77 clockwise to "off" position moves the tappet 76 from the recess 78 to the recess 79 and positions the lever 81 so that the lower end of the pawl 115 is in the path of the arcuate surface 116 to block the releasing movement of the lever 117.

In addition to the means just described, there is another means for blocking the releasing movement of the lever 117. This latter means is under control of the traveling carriage and will now be described. Calling attention to Figs. 3, 6 and 12, secured in the cross-frame 58 is a stud 155 which rotatably supports a hanging bar lever 156 having an upwardly extending projection 157 which cooperates with a lug 158 on a stop 159 adjustably mounted on a traveling carriage stop bar 160 secured to the traveling carriage 33. A hanging bar lever 161 pivotally connects the lever 156 to a bell crank 162 turnably mounted on a shaft 163 journaled in the frames 30 and 31. A link 164 pivotally connects the bell crank 162 to a pawl 165 loosely supported on the shaft 114 and normally maintained in the path of the arcuate surface 116 of the lever 117 by means of a spring 166. A projection on the hanging bar 161 cooperating with a printer top plate 167 (Fig. 6) limits the action of the spring 166 and positions the lever 156 and the pawl 165.

In the instant machine there are two stops 159, one for each column on the ledger sheet in which checks are posted. When the traveling carriage is tabulated to a check column the lug 158 on the stop 159 engages the projection 157 (Figs. 3 and 6) of the lever 156 to rock said lever downwardly, which through the link 161 rocks the bell crank 162 clockwise as pictured in Fig. 6, and this by means of the link 164 rocks the pawl 165 also in a clockwise direction to move the lower end thereof out of the path of the arcuate surface 116 on the lever 117.

From the foregoing description it will be seen that with the lever 77 in the "on" position as shown in Fig. 4 and the traveling carriage 33 (Fig. 3) tabulated to a check column the obstructing pawls 115 and 165 are moved out of the path of the lever 117.

There is still another obstructing member which cooperates with the lever 117 but as it has no bearing upon the mechanism just described it will not be described until later in this specification.

When the machine is released for a tax posting operation initial movement rearwardly of any one of the actuator racks 39 (Figs. 3, 7, 8 and 12) causes the upper portion of its extension 42 to engage the rod 145 to rock the arm 144 clockwise which in turn rotates the latch 136 until the hook 137 is latched over the flat portion of the stud 138. This secures the stud 138 between the hook 137 and a V shaped notch in the plate 133. It will be recalled that the actuator leading frame 64 (Figs. 3 and 7) oscillates first counterclockwise and then back to normal position. This by means of the link 141 rocks the arm 139 first counterclockwise and then back to the position shown in Fig. 7. The stud 138 cooperating with the latch 136 rocks the plate 133 (see also Figs. 8 and 9) and the lever 117, first in a clockwise direction causing the pawl 120 to engage the stud 123 to rock the latch 124 counterclockwise, thereby disengaging the notch in the arm 126 of said latch from the stud 127. This releases the actuator arm 128 to the action of a spring 168, which rotates said arm clockwise until an upward extension 169 thereof engages a No. 4 totalizer transfer restoring bar 170. This clockwise movement of the arm 128 causes the cam slot therein, in cooperation with the stud 131 to rotate the segment 132 sufficiently in a clockwise direction to advance the units of cents wheels 45 two steps to add the amount of the tax in the No. 4 totalizer.

When the actuator racks 39 and their extensions 42 reach the end of their initial movement rearwardly the No. 4 totalizer is moved into engagement with the extensions 42 of said actuator racks. This disengages the units of cents wheel 45 (Fig. 7) from the segment 132 for a sufficient length of time to allow said segment 132 and the arm 128 to be restored to their untripped positions. This is accomplished by means of the restoring bar 170, which moves forwardly simultaneously with the engagement of the totalizer wheel with the extensions 42 of the racks, to return the arm 128 counterclockwise to allow the notch in the arm 126 of the latch 124 to re-engage the stud 127. The latch 124 is free to re-engage the stud 127 at this time because in the meantime the stud 123 has moved out of the plane of the pawl 120 and said latch 124 has been returned clockwise by the spring 130.

For a detailed description of the timing and operations of the restoring bar 170, reference may be had to the patent to Ellis, 1,203,863, issued on November 7, 1916.

Before the actuator racks 39 start their return movements forwardly the No. 4 totalizer is disengaged therefrom and the units of cents wheel 45 is re-engaged with the segment 132. The restoring bar 170 is returned to the position shown in Fig. 7 at the end of the operation of the machine. It will be recalled that the mechanism for disengaging and engaging the units of cents totalizer wheel with the segment 132 was explained earlier in this specification and is well shown in Fig. 4.

*Amount key control of tax accumulating mechanism.*—If a tax posting operation is attempted without depressing an amount key the tax accumulating mechanism does not function and this is due to the fact that as all of the actuator racks 39 are retained in zero positions the arm 144 receives no movement and consequently the latch 136 is not hooked over the stud 138 thereby allowing the arm 139 to move idly back and forth without imparting movement to the lever 117. Consequently the latch 124 remains latched over the stud 127.

When the traveling carriage is out of check posting position the mechanism shown in Fig. 6 and described hereinbefore blocks the movement of the lever 117 thereby preventing accumulation of the tax irrespective of whether any of the amount keys 35 (Fig. 3) are depressed or not. In such a case the actuator extensions 42 (Figs. 7 and 8) in cooperation with the rod 145 move the arm 144 clockwise to hook the latch 136 over the stud 138 in the usual manner. However, due to the fact that clockwise movement of the lever 117 is blocked, the plate 133 moves independently thereof flexing the spring 134. Moving the lever 77 (Fig. 4) clockwise to the "off" position accomplishes the same result by positioning the lever 81 so that the pawl 115 is moved into the path of the arcuate surface 116 of the lever 117. This effectively blocks the actuating movement of said lever 117 thereby preventing accumulation of the tax in the No. 4 totalizer irrespective of the fact that amount keys have been depressed.

*Tax totalizer clearing mechanism.*—After the checks issued by a particular depositor and cleared by the bank during a certain period of time have been posted, the traveling carriage of the accounting machine is tabulated to a position where the tax column on the ledger sheet is in alignment with the printing segments. In this column the No. 4 or tax totalizer is cleared, the total amount of the tax printed, and simultaneously subtracted from the depositor's balance which is contained in the add-subtract or balance totalizer. The stop that locates the tax column opposite the printing segment also selects the No. 1 or balance totalizer for a subtract operation. Mechanism operated by a cam located on the rear of the traveling carriage simultaneously conditions the No. 4 or tax totalizer for a total taken operation, and unless this mechanism is disabled in a manner and for a purpose presently to be described, the operation in the No. 4 totalizer will be a total taking operation. The mechanism for automatically conditioning the No. 4 or tax totalizer for a total taking operation is illustrated in Figs. 4 and 5 and will now be described.

When the tax lever 77 is shifted to its "on" position as shown in Fig. 4 a stud 188 in an extension 189 of the lever 81 rocks an extension 190 of a link 191 into operative alinement with a stud 192 in an arm 193 pivoted on a screw stud 194 secured in the left machine frame 30. The stud 192 is adapted to cooperate with a camming surface 195 on a No. 4 total cam 196, a fragment of which is here shown. The rearward end of the link 191 is pivoted to an arm of a bell crank 197 loose on a stud 211 secured in a plate 226 fastened to the machine case 32. The bell crank 197 carries a stud 198 which cooperates with the lower end 199 of a total control pawl 200 the upper end of which is pivoted to a right-angled extension 201 of a pitman 202 slidably mounted on the machine case 32 by means of a stud 203 extending through a slot in the extension 201 and secured in the machine case, and a stud 204 extending through a slot in the upper end of the pitman 202 and secured in a bracket 205 fast to a traveling carriage guide rail 206 which is also secured to the machine case 32.

The upper end of the pitman 202 carries a roller 207 which cooperates with a No. 4 total cam 208 secured to a carriage return bracket 209 fast to a ball race 210 secured to the traveling carriage 33, see also Fig. 3. A link 212 pivotally connects the pawl 200 to an arm 213 secured on a shaft 178, journaled in the frames 30 and 31, for a purpose presently to be described. A spring 214 is tensioned between the pawl 200 and the machine case 32 to retain the pitman 202 upwardly and simultaneously urge the pawl 200 counterclockwise to normally maintain the extension 199 thereof in operative alinement with the stud 198 in the bell crank 197. A torsion spring 215 urges the bell crank 197 clockwise against a stop stud 216 secured in the plate 226 to normally maintain the link 191 in ineffective position as here shown.

When the tax control lever 77 (Fig. 4) is in the "on" or effective position, shifting the traveling carriage to the tax printing position causes the cam 208 to force the pitman 202 and the pawl 200 downwardly to rock the bell crank 197 counterclockwise thereby causing the extension 190 of the link 191 to engage the stud 192 to rock the arm 193 clockwise, which causes the stud 192 in cooperation with the camming surface 195 to rock the total cam 196 into effective position to condition the No. 4 totalizer for a total taking operation. When the traveling carriage is moved away from tax position the springs 214 and 215 return the automatic tax total taking mechanism to ineffective position. Shifting the tax lever 77 forwardly to "off" or ineffective position lowers the extension 190 of the link 191 out of the path of the stud 192 thereby rendering ineffective the automatic tax total taking mechanism regardless of the position of the traveling carriage.

The arm 193 (Fig. 4) is flexibly connected to a bell crank 217 by means of a spring 218 which is tensioned to urge said arm 193 into engagement with a stop stud 219 carried by the bell crank 217. A link 220 pivotally connects the bell crank 217 to a key latch 221 loosely mounted on a screw stud 222 secured in the left machine frame 30. The latch 221 has a right angled extension arranged to cooperate with a notch 223 in a No. 4 total key 224.

Depressing the No. 4 total key 224 moves the notch 223 in alinement with the right angled extension of the latch 221 allowing said latch to be rocked clockwise by a spring 225 to enter the right-angled extension in the notch 223 to retain the No. 4 total key depressed. This clockwise movement of the latch 221 through the link 220 rocks the bell crank 217 and the arm 193 clockwise, causing the stud 192 in cooperation with the camming surface 195 to rock the No. 4 total cam 196 into effective position. This flexible connection between the arm 193 and the bell crank 217 makes it possible for said arm 193 to move independently of the bell crank 217 and the latch 221 when the No. 4 totalizer is automatically conditioned for a tax total taking operation by the mechanism just described.

*LS key control of tax mechanism.*—As previously explained sometimes several checks are assembled in a bunch and the total amount of the several checks posted at one time. In such a case it is necessary to disable the tax accumulating mechanism while posting the amount of the several checks and in a subsequent operation set the total amount of the tax up on the keyboard and subtract it from the depositor's balance. The mechanism for accomplishing this result is well shown in Fig. 10 and will now be explained.

Located on the extreme lefthand side of the keyboard is a row of keys similar to a row of amount keys. However, these keys are printing keys only and have no effect on the different totalizers of the machine. This row of printing keys control a printing segment similar to the amount segment 51 shown in Fig. 3 for the printing of symbols characteristic of the type of operation being performed. In addition to the above use, the key 171 (Fig. 10) in the No. 1 position which will hereinafter be referred to as the LS key, has an extension 172 carrying a stud 173 which cooperates with an angular camming surface 174 on a beam 175 the forward end of which is supported in a slotted stud 176 secured to the machine base plate. The rearward end of the beam 175 is pivoted to an arm 177 secured on a shaft 178 journaled in the main frames 30 and 31 and having secured thereon another arm 179 connected by a link 180 to a pawl 181 loose on the shaft 114 (see also Fig. 3). The arm 179 is connected by another link 182 to an arm 183 pivoted at 184 to the printer frame and connected by a hook-shaped link 185 to a symbol printing segment 186 rotatably supported by an arm 187 similar to the arm 52 for the amount printing segment 51 shown in Fig. 3.

In posting the total amount of a bunch of checks the LS key 171 (Fig. 10) is used in conjunction with the amount keys 35. Depressing the LS key causes the stud 173 in cooperation with the camming surface 174 to shift the beam 175 forwardly which in turn rocks the arm 177, the shaft 178 and arm 179 in a counter-clockwise direction as observed in Fig. 10. This by means of the link 180 rocks the pawl 181 also counterclockwise into the path of the arcuate surface 116 on the lever 117 thereby blocking movement of the tax actuating mechanism and thus preventing the automatic accumulation of the tax in the No. 4 totalizer. Counter clockwise movement of the arm 179 by means of the link 182, the arm 183 and link 185 positions the printing segment 186 so that a distinguishing mark characteristic of this particular type of operation will be printed beside the amount.

The tax on the several checks in such a bunch is taken care of in the following manner: In posting the total amount of the bunch of checks, the machine is released for operation by means of a combination release and shift tabulation bar, which causes the traveling carriage to be automatically tabulated to the tax column immediately after the posting operation is completed. With the traveling carriage in this position it will be recalled that the No. 4 totalizer is conditioned for a total taking operation by means of the mechanism shown in Figs. 4 and 5, and the No. 1 or balance totalizer is conditioned for a subtract operation by means of a marginal stop such as the stop 159 (Fig. 3). In this instance it is necessary for the operator to set up the amount of the tax on the several checks in the bunch on the keyboard, in order that it may be subtracted from the balance totalizer. This tax is generally computed mentally; for example, if there are ten checks in the bunch and the tax is two cents on each check, it can readily be seen that the total tax will be twenty cents, and this is the amount which the operator sets up on the amount keys.

When a totalizer is selected and conditioned for a total taking operation, mechanism is rendered effective which releases all depressed amount keys at the very beginning of such totalizing operations. Therefore, in order to prevent the release of the depressed amount keys when entering the tax from the keyboard it is necessary to disable the mechanism which automatically conditions the No. 4 totalizer for a total taking operation. This is accomplished by again depressing the LS key 171 (Fig. 10), which as previously stated, by means of the beam 175 and the arm 177 rocks the shaft 178 counterclockwise. This by means of the arm 213 (Fig. 4) and the link 212 shifts the pawl 200 clockwise to move the lower extension 199 thereof out of the path of the stud 198 in the bell crank 197. The spring 215 then immediately restores the bell crank 197 and the link 191 to ineffective position, thereby allowing the arm 193 and the No. 4 total cam 196 to be restored to ineffective position. Subsequently releasing the machine for operation allows the total tax on the bunch of checks to be posted in the tax column of the ledger sheet and simultaneously subtracted from the balance totalizer.

Depression of the LS key 171 disables the arm 117 so that the segment 132 will not add into the tax totalizer when a tax is entered from the keyboard. Such depression of key 171 prevents operation of the segment 132, through elements 175, 177, 179, 180 and 181 (Fig. 10) in the manner hereinbefore described.

*Disabling tax accumulating mechanism by means of control keys.*—As previously stated, located on the extreme left-hand side of the machine keyboard is a row of control keys 226 one of which is a tax "Exempt key" 227, Fig. 11, the lower ends of which are adapted to cooperate with graduated camming surfaces 228 on a symbol segment locating plate 229 mounted to slide horizontally on a pair of studs 230 secured in the left machine frame 30. A link 231 operatively connects the plate 229 to a downwardly extending projection 232 of the arm 213 (Fig. 4).

Depression of any one of the control keys causes the lower end thereof in cooperation with one of the graduated camming surfaces 228 to shift the plate 229 forwardly, which by means of the link 231 and the arm 213 rocks the shaft 178 and the arm 179 (Figs. 4, 10 and 11) counterclockwise to position the symbol printing segment 186 so that upon subsequent operation of the machine a character indicative of the type of operation being performed will be printed on the ledge sheet. This counterclockwise movement of the arm 179 (Fig. 10) also moves the pawl 181 in the path of the arcuate surface 116 to block the actuator releasing movement of the lever 117 and counterclockwise movement of the arm 213 rocks the lower end 199 of the pawl 200 out of the path of the stud 198 to render ineffective the automatic total taking mechanism for the No. 4 or tax totalizer. Therefore it will be seen that in addition to controlling the functions of the machine depression of the control keys also disables the automatic tax feature.

*Tax exempt key.*—Certain kinds of notes used to take the place of checks and counter checks supplied by the bank for the convenience of its depositors are tax exempt. Consequently in posting such a note or check on the depositor's ledger sheet it is necessary that the automatic tax accumulating mechanism be disabled at this time, and also it is desirable that a distinguishing mark be printed beside the tax exempt item to show that no tax has been charged on this item. In posting a tax exempt check or note the operator in addition to setting up the amount of the note on the keyboard depresses the tax exempt key 227 (Fig. 11) which in cooperation with the graduated camming surface 228 shifts the plate 229 and the link 231 (see also Fig. 4) forwardly to rotate the arm 213 and the shaft 178 counterclockwise. This through the arm 179 (Fig. 10) disables the tax actuating mechanism and simultaneously positions the symbol printing segment to print a distinguishing mark, in this case "EX" beside the tax exempt item.

Counterclockwise movement of the arm 213 (Fig. 4) also moves the pawl 200 out of the path of the stud 198 to disable the mechanism for automatically taking a total from the No. 4 totalizer. However, in this particular instance the disabling of this automatic total taking mechanism is incidental, and means nothing as far as the tax exempt operation is concerned.

The tax exempt key 227 (Fig. 11) is normally a subtract key and selects the No. 1 totalizer for a subtract operation, but in its present use as a tax exempt key its function as a subtract key is not needed, as the balance totalizer is automatically conditioned for subtract operation when the traveling carriage is in check posting position by means of stops arranged on said traveling carriage.

*Operation of the machine.*—While it is felt that an understanding of the operation of the machine will have been obtained from the preceding description, still it is thought that a brief outline of the operation and functions of the machine will not be amiss.

Fig. 1 represents a ledger sheet for use where the automatic tax feature is employed and Fig. 2 represents a ledger sheet for use when the automatic tax feature is disabled or not employed. In balancing checking accounts most banks use a system whereby a ledger sheet such as that shown in Figs. 1 and 2 is provided for each depositor. Some means of duplicating the record contained on the ledger sheet is provided; for example, in most banks a "duplicate run" is made on a statement sheet. However the ledger sheet may be folded over to form a double sheet and a piece of carbon paper interposed between the two sheets. When a sheet is filled the duplicate is detached and filed for record and the original is generally sent to the depositor along with his cancelled checks as a periodical statement of his account.

The ledger sheet for John Doe shown in Fig. 1 has at the extreme left an old balance column, next a date column, a space for posting two rows of checks, a tax column, a depositor's column and on the extreme right a new balance column. The machine of this invention has a front feed platen, the throat of which is automatically opened for removal and insertion of ledger sheets while the traveling carriage is being automatically returned to starting position. Let us assume that the traveling carriage is in the starting position, the platen throat is open and all the totalizers are standing at zero.

The operator after seeing that the tax control lever 77 (Fig. 4) is in the "on" or effective position, inserts the ledger sheet containing John Doe's account in the throat and locates said sheet in relation to the type carriers by alining the last printed line thereon with a line finding bar on the traveling carriage and then closes the platen throat. The traveling carriage is now in position to print the old balance which is obviously the last new balance found in the new balance column on the extreme right of the ledger sheet. This old balance, which in this case is $6500.00, is set up on the keyboard and the machine released for operation by depressing the starting bar. When the traveling carriage is in the old balance printing position a stop thereon automatically selects and conditions the No. 1 or balance totalizer for addition, which results in the $6500.00 being added in the No. 1 totalizer and simultaneously printed on the ledger sheet.

After this operation the traveling carriage is automatically tabulated to the next position, which is the first division of the check column where one of the stops 159 (Fig. 3) automatically selects the No. 1 or balance totalizer for subtraction and simultaneously selects and conditions the No. 3 totalizer for addition, the latter in order to preserve a grand total of the checks posted during a certain period. The stop 159 by means of the mechanism shown in Fig. 6 also enables the automatic tax accumulating mechanism. In the instant machine a bichrome ribbon is used and in subtract operations it is automatically shifted to red printing position. The operator sets up the amount of the check, in this case $100.00, on the keyboard, and as this is the only check to be posted at this time, the skip tabulating bar is depressed, which releases the machine for operation to print the $100.00 and simultaneously the date, May 1st, and add the two-cent tax in the No. 4 totalizer, after which the traveling carriage is automatically skip-tabulated to the tax column. Here the machine is released for operation by depressing the starting bar and the stop on the traveling carriage causes the No. 1 or balance totalizer to be conditioned for a subtract operation and the mechanism illustrated in Fig. 4 causes the No. 4 totalizer to be cleared and the amount cleared therefrom in this instance two cents subtracted from the depositor's balance and printed in red on the ledger sheet.

Immediately after this operation the traveling carriage automatically tabulates to the deposit column on the ledger sheet but as the depositor has made no deposits since his account was last balanced, there is no work to be performed in this position, so the operator tabulates the traveling carriage to the new balance column, then depresses the balance key 226 (Fig. 11) to select and condition the No. 1 totalizer for clearing and simultaneously release the machine for operation. In this position a stop on the traveling carriage automatically selects the No. 2 totalizer for addition in order to preserve a grand total of the new balances. The date is also printed with the new balance and so is a new balance identification mark, in this case an asterisk.

As a general rule, each account is balanced daily. Naturally if there are no cancelled checks or deposits to be posted in a particular account there is nothing to be done to the ledger card for that account at this time.

It will be noted that on May 3 three checks were subtracted from John Doe's balance. In the instant machine the traveling carriage tabulates automatically to post the first two checks of $10.00 and $20.00 respectively in horizontal alinement. In posting the third check the operator touches a carriage return lever which automatically returns the traveling carriage to the first row in the check column and causes the ledger car to be automatically line-spaced for the posting of the $5.00 check. It is obvious that the traveling carriage may be returned in this manner as many times as is necessary.

On May 12 a bunch consisting of five checks, the total value of which was $100.00, was deducted from John Doe's old balance of $6114.88. In this case the automatic tax accumulating feature cannot be used as there will be only one posting for the five checks, and this would result in only two cents, the tax on one check, being accumulated in the No. 4 or tax totalizer. In such a case the operator in addition to setting up the $100.00 on the keyboard depresses the LS key 171 which through the mechanism shown in Fig. 10 disables the tax accumulating mechanism and positions the symbol printing segment so that a distinguishing mark will be printed opposite the $100.00 to designate this amount as the total for several checks. In releasing the machine for this operation the operator uses the skip tabulating bar which causes the traveling carriage to be tabulated to the tax column immediately after this operation. Here the operator desires to subtract the amount of the tax on the five checks from the depositor's balance and to accomplish this it is necessary to set up the amount of the tax, in this case 10 cents, on the keyboard, depress the LS key and release the machine for operation by depressing the starting bar. This time the LS key, through the mechanism shown in Figs. 4 and 10, disables the automatic total taking mechanism for the No. 4 or tax totalizer so that the depressed amount keys will not be released before the amount of the tax is subtracted from the No. 1 or balance totalizer and, as in the preceding operation, the asterisk or distinguishing mark is printed opposite the amount.

In posting tax-free checks depression of the Tax Exempt key through the mechanism shown in Figs. 10 and 11, disables the automatic tax accumulating mechanism and positions the symbol printing segment so that "EX" is printed opposite the tax exempt checks.

To use the machine as a regular posting machine without the automatic tax accumulating feature, all that is necessary is to move the tax lever to the "off" position, which as previously described, disables the tax mechanism. In such a case it is unnecessary to provide a column for the listing of tax items, and this space may be used to provide room in the check column for three rows of checks instead of two. The ledger sheet for Richard Roe, shown in Fig. 2, is arranged for use in the machine when the tax feature is not employed. It is thought unnecessary to go into detail concerning the system used with this ledger sheet as the usual procedure of setting up the old balance, subtracting the cancelled checks therefrom, adding the deposits to the remainder and arriving at a new balance by clearing the balance totalizer is employed. In this case, where the automatic tax feature is not employed the No. 4 or tax totalizer may be used for the storing of total deposits or total old balance, or in any other way desired.

In the system previously outlined for the ledger sheet shown in Fig. 1 the No. 2 totalizer was used for the storing of total new balances and the No. 3 totalizer for the storing of total checks. However, these totalizers are not limited to this use and may be used in any way desired by supplying the proper stops on the traveling carriage. For example, either of the totalizers may be used for storing totals of taxes or for the storing of total deposits, or if desired, for the storing of total old balances.

From the foregoing description it can be seen that the machine of the instant invention is very flexible in nature and can for that reason be used in various ways and by various business institutions. Therefore it is not intended to limit this machine to use by banking institutions or to the systems outlined above.

While the form of mechanism herein shown and described is admirably adapted to fulfill the objects primarily stated, it is to be understood that it is not intended to confine the invention to the form of embodiment herein disclosed, for it is susceptible of embodiment in various forms all coming within the scope of the claims which follow.

We claim:

1. In a calculating machine, the combination of a totalizer; differential actuators for the totalizer; a uniform actuating device for entering an amount in one of the wheels of the totalizer; means controlled by movement of the actuators to enable the uniform actuating device; and means to disable the uniform actuating device regardless of the enabling means.

2. In a machine of the class described, the combination of a totalizer; differential actuators for the totalizer; a uniform actuating means to add an amount in one of the wheels of the totalizer; means to operate the uniform actuating means; and means controlled by the actuators to render the last-named means effective.

3. In a machine of the class described, the combination of a totalizer; actuators for the totalizer; means to enter items in one of the wheels of the totalizer to accumulate amounts therein; means to operate the entering means; means to connect the entering means to the operating means; and means whereby the actuators control the connecting means.

4. In a calculating machine, the combination with a totalizer and differential actuators for the totalizer; of uniform actuating means to enter an amount in the totalizer; means to operate the uniform actuating means; and means intermediate the differential actuators and the operating means controlled by the differential actuators to connect the entering means to the operating means.

5. In a calculating machine, the combination with a totalizer and differential means to actuate the totalizer; of uniform actuating means to enter an amount in the totalizer; means to operate the uniform actuating means; means to connect the uniform actuating means to the operating means; and means operated by initial movement of one or more of the differential actuators to render the connecting means effective.

6. In a machine of the class described, the combination with a totalizer, and actuators therefor; of means to rotate one of the wheels of the totalizer a certain number of steps; means to release the rotating means; means to operate the releasing means; means to couple the releasing means to the operating means; means controlled by the actuators to operate the coupling means; and means to prevent movement of the releasing means regardless of the effectivity of the coupling means.

7. In a machine of the class described, the combination with a totalizer, and differential actuators therefor; of uniform actuating means to enter an amount in the totalizer; means to release the uniform actuating means; means to operate the releasing means; an element flexibly connected to the releasing means; means to connect the element to the operating means; and means controlled by the actuators to operate the connecting means.

8. In a machine of the class described having a traveling carriage, the combination of a totalizer; differential actuators to enter amounts in the totalizer; a uniform actuating device to enter an amount in the totalizer; means to render either entering means effective and simultaneously render the other entering means ineffective; means to condition the totalizer for a totalizing operation; means operated by the traveling carriage to operate the conditioning means; and means controlled by the rendering means to move the operating means to effective position.

9. In a machine of the class described, the combination of a totalizer; differential actuators to enter amounts in the totalizer; yieldably operated means to enter an amount in the totalizer; restraining means for the yieldably operated means; means to release the restraining means; means to operate the releasing means; a member flexibly connected to the releasing means; means to connect the member to the operating means; means controlled by the differential actuators to operate the connecting means; and means to restore the yieldably operated means during machine operation.

10. In a machine of the class described having a traveling carriage, the combination with a totalizer, and differential actuators for entering amounts therein; of yieldably operated means to rotate one of the wheels of the totalizer a fixed number of steps; restraining means for the yieldably operated means; means to release the restraining means; means to operate the releasing means; a member flexibly connected to the releasing means; a latch on the member; means operated by the actuators to engage the latch with the operating means; an element normally obstructing movement of the releasing means; and means whereby the traveling carriage in certain tabulated positions thereof moves the element out of the path of the releasing means.

11. In a calculating machine having a traveling carriage in combination with a totalizer, and differential actuators for the totalizer; of uniform actuator means to enter an amount in the totalizer; means on the traveling carriage to render the uniform actuating means effective; means to condition the totalizer for total taking operations; means on the traveling carriage to control the total conditioning means; and manipulative means to enable or disable the uniform actuating means and the total conditioning means.

12. In a machine of the class described, the combination of a totalizer; differential actuators for the totalizer; uniform actuating means to enter an amount in the totalizer; a resiliently operated member to operate the uniform actuating means; means to release the resiliently operated member; means to operate the releasing means; and an element intermediate the releasing means and the operating means to flexibly connect said releasing means to said operating means.

13. In a machine of the class described, the combination of a totalizer; differential actuators for the totalizer; uniform actuating means to enter an amount in the totalizer; a resiliently operated member to operate the uniform actuating means; means to release the resiliently operated member; means to operate the releasing means; means including an arm and a latch to connect the releasing means to the operating means; and means whereby the actuators control the connecting means.

14. In a calculating machine, the combination with a totalizer, and differential means to actuate the totalizer; of uniform actuating means to enter an amount in the totalizer; a resilient member to operate the uniform actuating means; means to restrain the resilient member; means to release the restraining means; means to operate the releasing means; means to connect the releasing means to the operating means; and means operated by initial movement of the differential actuating means to effectuate the connecting means.

15. In a calculating machine, the combination with a totalizer, and differential actuating means to enter amounts in said totalizer; of uniform actuating means to enter an amount in the totalizer; a resilient member to operate the uniform accumulating means; means to restrain the resilient member; means to release the restraining means; means to operate the releasing means; a member intermediate the releasing means and the operating means, and flexibly connected to the former; means to connect the member to the operating means; and means controlled by the differential actuating means to operate the connecting means.

16. In a calculating machine, the combination of a totalizer; differential actuating means for the totalizer; resiliently operated actuating means to enter an amount in the totalizer; means to release the resiliently operated entering means; a member flexibly connected to the releasing means; means to operate the member; means to connect the member to the operating means; means to normally obstruct the releasing means, thereby causing the member to move independently thereof when the connecting means is effective; and means to render the obstructing means ineffective.

17. In a machine of the class described having a traveling carriage, the combination of a totalizer, differential actuators for entering amounts in the totalizer, a uniform actuating device rendered operable by said carriage in predetermined positions thereof for entering an amount in the totalizer, means for conditioning the totalizer for total taking operations, means operable by the carriage in another predetermined position thereof for actuating the conditioning means, and means to simultaneously enable or disable the carriage control of the uniform actuating means and the actuating means for the total taking conditioning means.

18. In a machine of the class described having a traveling carriage and a totalizer, the combination of means to condition the totalizer for total taking operations, means to actuate the conditioning means, means including a shiftable member for operating the actuating means from the carriage, means to move said shiftable member to render the carriage control ineffective on said actuating member, and manipulative means to shift the actuating member to render it ineffective on the conditioning means even though the carriage operates the actuating member.

RAYMOND A. CHRISTIAN.
JESSE R. GANGER.
EARL E. HOLT.